United States Patent [19]

Uchida et al.

[11] 4,418,417
[45] Nov. 29, 1983

[54] RECEPTION CONTROL SYSTEM FOR PAPER COUNTING MACHINE

[75] Inventors: Isamu Uchida; Moriatsu Kawakami, both of Tokyo, Japan

[73] Assignee: Laurel Bank Machine Co., Ltd., Tokyo, Japan

[21] Appl. No.: 251,562

[22] Filed: Apr. 6, 1981

[30] Foreign Application Priority Data

Apr. 8, 1980 [JP] Japan .................. 55-47465[U]

[51] Int. Cl.³ ............................................ G06M 7/06
[52] U.S. Cl. ...................................... 377/8; 377/39; 377/45; 271/259
[58] Field of Search ......... 235/92 SB, 92 PE, 92 EV, 235/92 CA; 355/14 R, 3 SH, 14 CU, 14 SH; 271/259; 377/8, 39, 45

[56] References Cited

U.S. PATENT DOCUMENTS

| | | | |
|---|---|---|---|
| 3,588,472 | 6/1971 | Glaster et al. | 235/92 SB |
| 3,710,936 | 1/1973 | Mizunuma | 235/92 SB |
| 3,784,790 | 1/1974 | Hatanaka et al. | 235/92 SB |
| 3,944,794 | 3/1976 | Reehil et al. | 235/92 SB |

*Primary Examiner*—Gary Chin
*Attorney, Agent, or Firm*—Fleit, Jacobson, Cohn & Price

[57] ABSTRACT

Herein disclosed is a reception control system for use with a paper counting machine, which is intended to prevent the excessive reception of the sheets of paper due to the delay in the reception control timing. The reception control system includes a reception sensor for instantly sensing each of the sheets of paper received, an up-down counter unit having the functions of up and down counters for counting up the number of the sheets of paper received in accordance with the output of the reception sensor and subtracting the number of the sheets of paper to be excluded from the number of the sheets of paper counted up thereby to correct the number of the sheets of paper received, and a reception control comparator unit for comparing the output of the up-down counter unit and the output of a reference number memory unit thereby to compare the number of the sheets of paper corrected and the output of the reference number memory unit so that a drive control unit may be controlled to control the reception of the sheets of paper in accordance with the compared result.

2 Claims, 5 Drawing Figures

RECEPTION CONTROL SYSTEM FOR PAPER COUNTING MACHINE

BACKGROUND OF THE INVENTION

1. Field of the Invention

The present invention relates to a paper counting machine for excluding a sheet or sheets of counterfeit paper from sheets of paper received thereby to count only the number of sheets of genuine paper, and more particularly to a reception control system to be used with the paper counting machine of the above type for preventing the excessive reception of the sheets of paper due to the delay in the reception control timing.

2. Description of the Prior Art

In a conventional reception control system, it takes excessive time for sheets of paper received to be actually discriminated by means of a sensor. Therefore, a paper counting machine incorporating the reception control system has a drawback that a sheet or sheets of the undisriminated paper, which has been unnecessarily received due to the delay coming from the aforementioned excessive time so that it is counted as paper to be excluded, is mixed into the intrinsic paper to be excluded whereby the undiscriminated paper has to be taken out so that it may be again discriminated and counted.

SUMMARY OF THE INVENTION

In view of the background thus far shortly reviewed, it is an object of the present invention to provide a reception control system for a paper counting machine, which eliminates the delay in the control timing of a paper reception thereby to prevent the excessive reception of sheets of paper due to that delay.

According to a feature of the present invention, there is provided a reception control system for a paper counting machine, comprising a paper receiving mechanism for receiving sheets of paper; a drive control device for controlling the drive of said paper receiving mechanism; a genuineness discriminating unit for discriminating the genuineness of the sheets of paper received; and a reference number memory unit stored with the reference number of the sheets of genuine paper to be received, wherein the improvement comprises: a reception sensor for instantly sensing each of the sheets of paper received; an up-down counter unit having the functions of up and down counters for counting up the number of the sheets of paper received in accordance with the output of said reception and subtracting the number of the sheets of paper to be excluded from the number of the sheets of paper counted up thereby to correct the number of the sheets of paper received; and a reception control comparator unit for comparing the output of said up-down counter unit and the output of said reference number memory unit thereby to compare the number of the sheets of paper corrected and said reference number so that said drive control unit may be controlled in accordance with the compared result.

BRIEF DESCRIPTION OF THE DRAWINGS

Other objects, features and advantages of the present invention will become apparent from the following description taken in conjunction with the accompanying drawings, in which.

DESCRIPTION OF THE PREFERRED EMBODIMENT

Before entering into the detailed description of the present invention, one of the reception control system to be used with a paper counting machine of the prior art, which is made operative to receive sheets of paper, to distribute them into sheets of genuine paper and a sheet or sheets of counterfeit paper to be excluded, and to count the number of the sheets of the genuine paper, will be described in the following with reference to the block diagram shown in FIG. 1.

Figure 1:
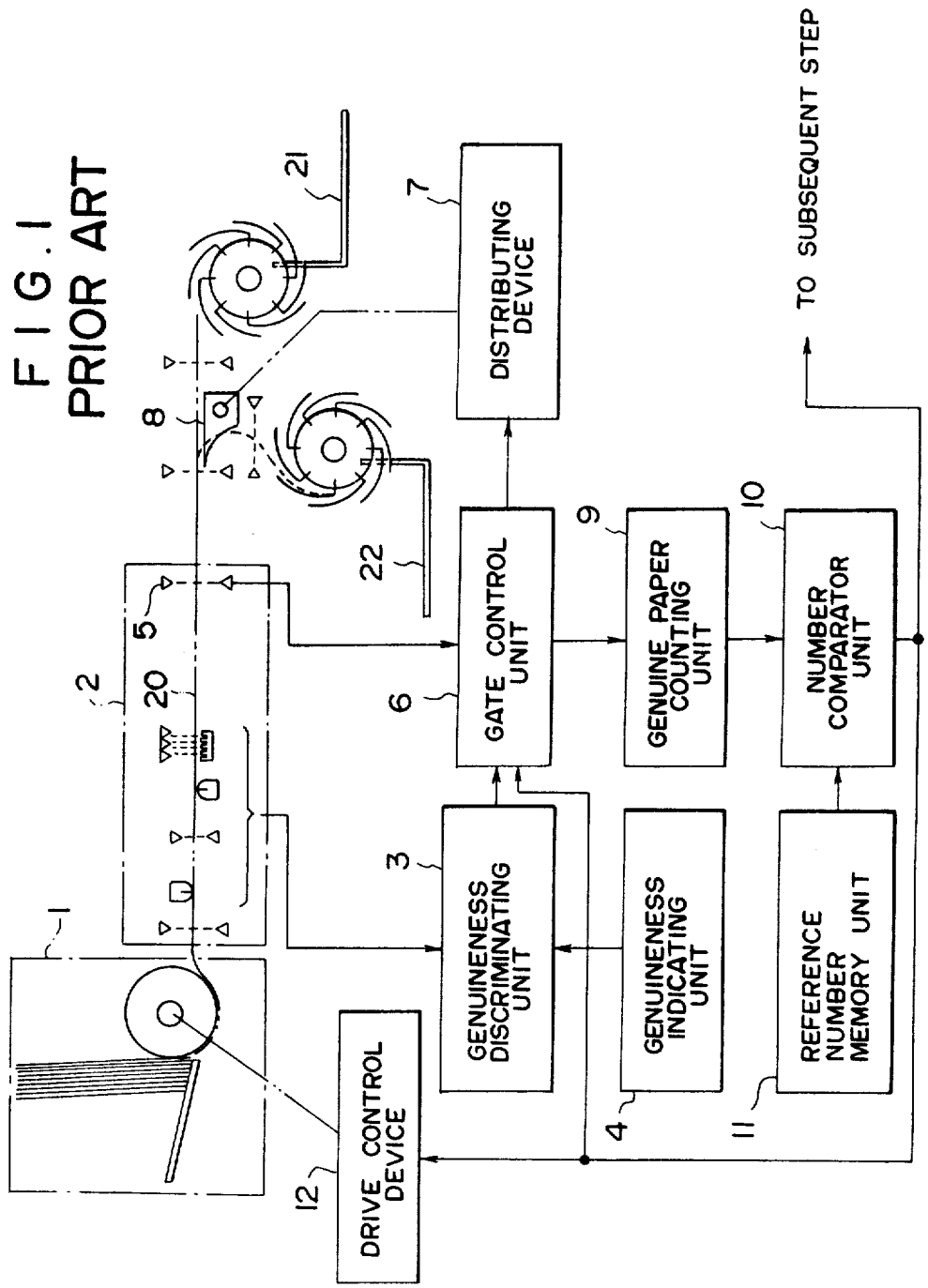
FIG. 1 is a block diagram showing the construction of a paper counting machine according to the prior art.

Reference numeral 1 appearing in FIG. 1 indicates a paper receiving mechanism for receiving sheets of paper to be counted. Numeral 2 indicates an inspecting section for sensing the sizes and shapes of paper by means of sensors such as photoelectric elements or magnetic heads. Numeral 3 indicates a genuineness discriminating unit for discriminating genuine papers from counterfeit papers by comparing the output of the inspecting section 2 with the output of a genuineness indicating unit 4. Numeral 5 indicates a sensor for sensing that the paper has reached a predetermined discriminating position in the inspecting section 2. Numeral 6 indicates a gate control unit for controlling an input signal by the output timing of the sensor 5 and for feeding the signal out of its output terminal. Numeral 7 indicates a distributing device for actuating a distributing mechanism 8 thereby to distribute sheets of genuine paper and a sheet or sheets of counterfeit paper. Numeral 9 indicates a genuine paper counting unit for counting the number of the sheets of genuine paper. Numeral 10 indicates a number comparator unit for comparing the output of the genuine paper counting unit 9 and the output of a reference number memory unit 11 which stores a reference number of sheets (i.e., the aimed number of the sheets of genuine paper). Moreover, numeral 12 indicates a drive control device for driving the paper receiving mechanism 1, when the output of the number comparing unit 10 is an incoincidence output, and for stopping the same mechanism 1 when the same output is a coincidence output. Incidentally, numerals 20, 21 and 22 indicate a paper path, a storage unit for genuine paper, and a storage unit for counterfeit paper to be excluded, respectively.

Now, the paper counting machine having the construction thus far described is prepared to start its paper counting operation such that the reference number memory unit 11 stores the reference number previously, such that the genuine paper counting unit 9 is reset, and such that the drive control unit 12 is operated by the incoincidence output of the number comparator unit 10. The sheets of paper received in the paper receiving mechanism 1 are sensed by the inspecting section and are discriminated by the genuineness discriminating unit 3 whether they are genuine or counterfeit. In the case of the genuine paper, the output of the genuineness discriminating unit 3 is fed at the timing of the sensor 5 through the gate control unit 6 to the genuine paper counting unit 9 so that the number of sheets of the genuine paper is counted. In the case of the paper to be excluded, on the contrary, the output of the genuineness discriminating unit 3 is fed through the gate control unit 6 to the distributing device 7 so that no counting operation is performed in the genuineness paper counting unit 9. The number of the sheets of the genuine paper thus counted by the genuine paper counting unit 9 is compared with the reference number by the number comparator unit 10. When the reference number is reached in the genuine paper counting unit 9, a coincidence signal is fed out of the number comparator unit 10 so that the drive control device 12 is rendered inoperative to stop the reception of the paper. The control of the conventional reception control system thus far described will now be described with reference to the flow chart shown in FIG. 2. When the counting operation is started, the paper received at a block a is transferred at a next block b through the paper path 20. When the paper reaches a predetermined inspecting position, it is discriminated at a discriminating block c whether it is genuine or counterfeit. If the paper is discriminated to be the counterfeit one to be excluded, a step of excluding the counterfeit paper is performed (although not shown in the flow chart). In case the paper is discriminated to be the genuine one, it is counted at a next block d. At a comparing block e, the counted result and the reference number are compared whether they are equal or not. If that result is not equal, the flow is returned to the block a so that the receiving operation is continued. If, on the contrary, the result is equal to the reference number, the flow is proceeded to a subsequent block f so that the receiving operation is stopped. Thus, the counting procedures are completed. It should be noted here that there is a time delay before the paper received reaches the predetermined inspecting position.

In the reception control system having the construction thus far described (with reference to FIG. 1), it takes excessive time for the paper received by the paper receiving mechanism 1 to be actually discriminated at the timing of the sensor 5. More specifically, during the period from the time when the last genuine paper of the reference number is received to the time when the coincidence signal is fed out of the number comparator unit 10 thereby to stop the reception of any further paper, the paper next to the aforementioned reference number and the further next paper are erroneously received. Moreover, these excessive sheets of paper are treated to be excluded through the distributing device 7 by feeding the output of the aforementioned number comparating unit 10 through the gate control unit 6 to the distributing device 7.

Thus, the paper counting machine equipped with the reception control system of that conventional type thus far described has a drawback that the sheet or sheets of the undiscriminated paper, which has been unnecessarily received due to the aforementioned time delay so that it is counted as the paper to be excluded, is mixed into the intrinsically counterfeit paper to be excluded whereby the undiscriminated paper has to be taken out so that it may be again discriminated and counted.

Figure 3:
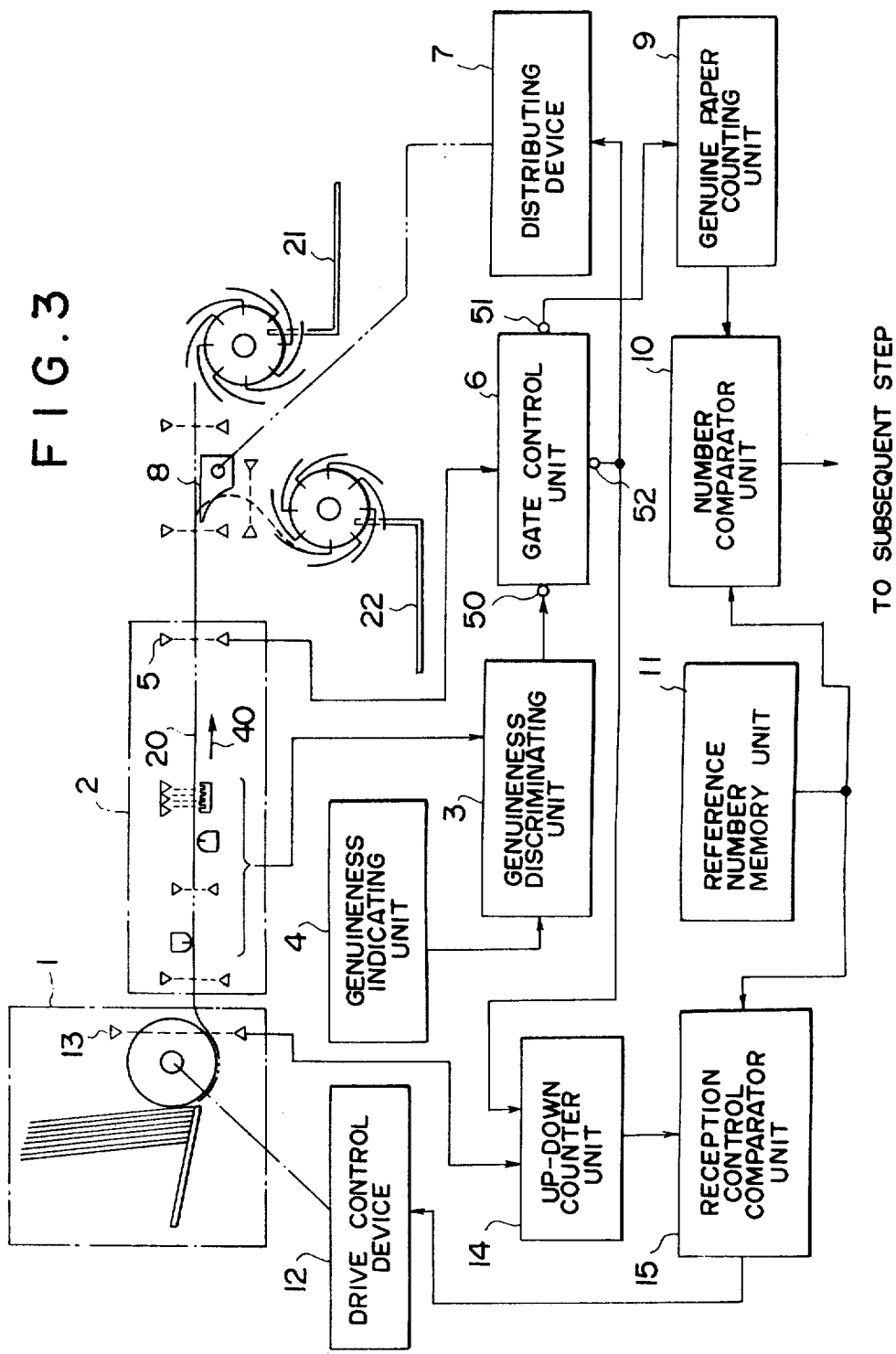
FIG. 3 is a block diagram showing the construction of one embodiment of the present invention.
Figure 4:
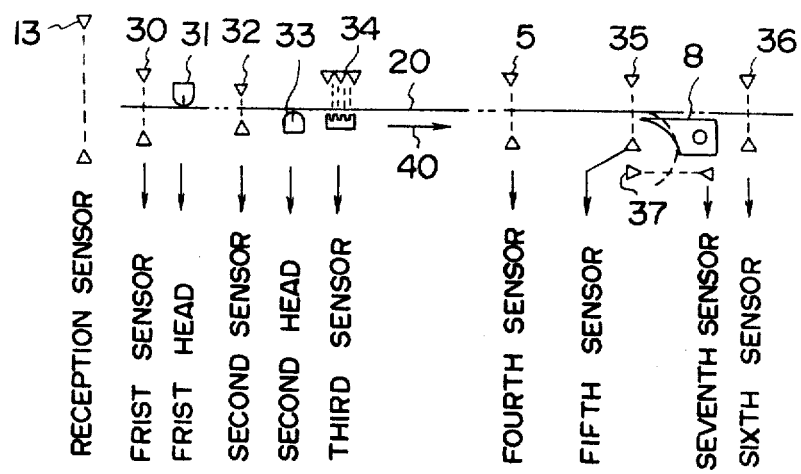
FIG. 4 is a schematic view showing the arrangement of sensors to be used in the embodiment.
Figure 5:
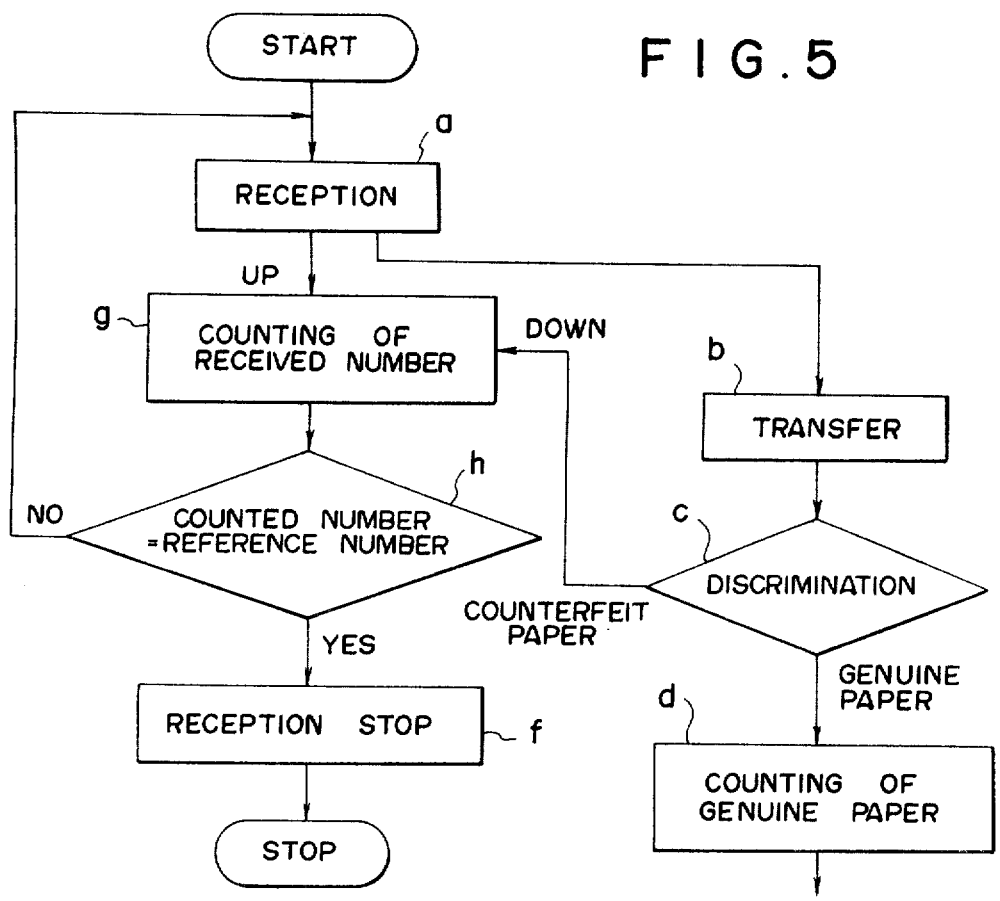
FIG. 5 is a flow chart for explaining the operations of a reception control system for use with the same embodiment.

Turning now to FIGS. 3 to 5, one embodiment of the present invention will be described in the following. FIG. 3 is a block diagram showing the construction of the embodiment. In FIG. 3, the blocks or parts corresponding to those shown in FIG. 1 are indicated with the same reference numerals, respectively. As shown, the gate control unit 6 has its input terminal 50 and output terminal 51 connected, while leaving its output terminal 52 disconnected, at the output timing of the sensor 5 in case the paper is genuine, but has its input terminal 50 and output terminal 52 connected, while leaving its other output terminal 51 disconnected in case the paper is counterfeit to be excluded. On the other hand, the number comparator unit 10 is made operative to compare the output of the genuine paper counting unit 9 and the output of the reference number memory unit 11 thereby to feed out a signal to be used at a subsequent step. It should be noted here that reference numerals 13, 14 and 15 indicate blocks which are additionally provided in the embodiment, respectively. The block 13 is a reception sensor such as a photoelectric element for sensing paper or the like (which is exemplified by paper currency in the present embodiment) immediately after it is received by the paper receiving mechanism 1. The block 14 is a up-down counter unit which has up and down counters for counting up the number of the sheets of paper received in accordance with the output of the aforementioned reception sensor 13 and for counting down the number of the sheets of paper to be excluded, in response to a signal from the gate control unit 6, thereby to correctly count the number of the sheets of paper received. Moreover, the block 15 is a reception control comparator unit for comparing the output of the up-down counter unit 14 and the output of the reference number memory unit 11 so that the drive control unit 12 is rendered inoperative to stop the reception of any following paper, when the compared outputs are formed coincident, and so that the drive control unit 12 is rendered operative to effect the reception of the following paper when the compared outputs are found incoincident. On the other hand, FIG. 4 is a view showing in detail the arrangement of sensors to be used in the present embodiment. Reference numerals 30 to 34 appearing in FIG. 4 indicate sensors such as photoelectric elements or magnetic heads for sensing the sizes, watermarks, printed patterns and so on of the sheets of paper received. Numeral 35 indicates a sensor for confirming the condition of the paper being transferred. Numeral 36 indicates a sensor for counting and confirming the number of the sheets of genuine paper. Numeral 37 indicates a sensor for resetting the distributing mechanism 8. Incidentally, the direction of transfer of the paper is indicated at arrow 40.

The operations of the reception control system having the construction thus far described according to the present embodiment will now be described in detail.

First of all, the reference number memory unit 11 is preset with the reference number, and the up-down counter unit 14 is reset. When the reception control comparator unit 15 feeds out an incoincidence output, the drive control device 12 is turned on so that the paper receiving mechanism 1 is rendered operative to start the reception of paper. Then, the reception sensor 13 instantly senses the sheets of paper received to feed out signals, which are counted up by the up-down counter unit 14. These operations are performed, each time the sheets of paper is received, so that the number of the sheets of the paper received is counted. Moreover, when the aforementioned paper is transferred in the direction of the arrow 40 through the transfer path 20 so that its leading end reaches the position of the sensor 5, then the output of the sensors 30 to 34 and the output of the genuineness indicating unit 4 are compared by the genuineness discriminating unit 3 thereby to discriminate whether that paper is genuine or counterfeit to be excluded. In case the paper is genuine, the output of the genuineness discriminating unit 3 is sent to the input terminal 50 of the gate control unit 6 and is fed out of the output terminal 51 of the gate control unit 6 at the timing of the sensor 5 to the genuine paper counting unit 9, in which it is counted up. And, the output of this genuine paper counting unit 9 is compared with the output of the reference number memory unit 11 so that the compared output is used at the subsequent step. In the meantime, since the output of the aforementioned genuineness discriminating unit 3 is blocked by the gate control unit 6 so that it is not fed to the distributing device 7, the distributing mechanism 8 is not rendered operative so that the genuine paper is transferred as it is to the genuine paper storage unit 21.

On the contrary, if the aforementioned paper is counterfeit to be excluded, the output of the genuineness discriminating unit 3 is fed out of the output terminal 52 of the gate control unit 6 at the timing of the sensor 5 to the distributing device 7. Then, this distributing device 7 renders the distributing mechanism 8 operative so that the counterfeit paper is excluded out to the excluded paper storage unit 22. At this time, the output at the output terminal 52 of the gate control unit 6 is also fed to the up-down counter unit 14 counts down. And, this counting-down operation is performed each time the counterfeit paper of the paper received reaches the position of the aforementioned sensor 5. In these ways, the up-down counter unit 14 partly summing up the number of the sheets of paper received and partly subtracts the number of the sheet or sheets of paper to be excluded. As a result, the output of the up-down counter unit 14 indicates "the number of the sheets of paper received minus the number of the sheet or sheets of paper to be excluded" at all times. Moreover, that output of the up-down counter unit 14 is compared by the next reception control comparator unit 15 with the output of the reference number memory unit 11 so that the drive control unit 12 is turned on to continue the reception, if the comparison generates the incoincidence output, but is turned off to discontinue the reception if the comparison generates the coincidence output. That is to say, the reception control system according to the present invention is equipped with the reception sensor 13 so that the paper received may be instantly sensed and so that the output of that reception sensor 13 is counted up by the up-down counter unit 14 thereby to count the number of the sheets of paper received, whereby the reception is instantly discontinued as soon as the number of the sheets of paper received reaches the reference number. In case, moreover, a sheet or sheets of paper to be excluded is included in the sheets of paper received, the number of the sheet or sheets of paper to be excluded is subtracted from the aforementioned number of the sheets of paper received so that the number of the sheets of paper received may be apparently short to supply the reception. This will be described in the following in a concrete case, in which 100 sheets of genuine paper is separated from 200 sheets of paper. Let it be assumed here that two sheets of paper to be excluded are included in the 40th and 60th orders of a bundle of paper. Then, immediately after the 40th paper has been received, the number of sheets of paper summed up is 40 but is counted down one when the 40th paper is discriminated to be counterfeit one. On the other hand, immediately after the 60th paper has been received, the number of the sheets of paper summed up is 59 but is again counted down one when the 60th paper is discriminated to be counterfeit one. As a result, when the 100th paper is received, the number of the sheets of paper summed up is 98, which indicates shortage of two sheets of paper to call for continuous reception of two additional sheets of paper. Thus, when the 102th paper is received, the number of the sheets of paper corrected is 100, whereupon the reception is discontinued.

Figure 2:
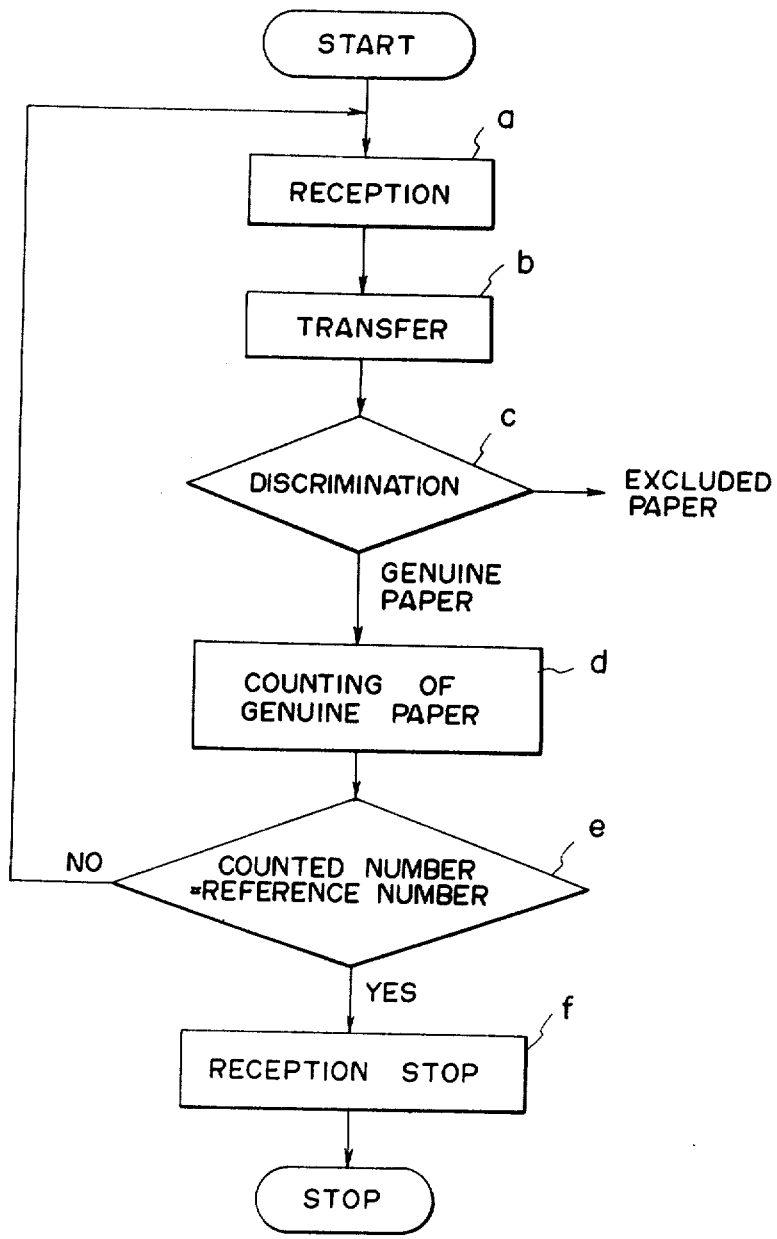
FIG. 2 is a flow chart for explaining the operations of a reception control system for use with the paper counting machine according to the prior art.

The foregoing reception controlling operations will be described in the following with reference to the flow chart shown in FIG. 5. In this flow chart, the blocks corresponding to those appearing in FIG. 2 are indicated with the same reference letters. As shown in FIG. 5, when the counting operation is started, the paper received at the block a is instantly counted at a block g, and the counted result is compared at a subsequent comparing block h with the reference number. Here, if the aforementioned counted result is not equal to the reference number, the flow is returned to the block a thereby to continue the reception. On the contrary, in case the counted result is equal to the reference number, the flow is advanced to the next block f thereby to instantly stop the reception. In the meantime, the paper received at the block a is transferred at the block b through the transfer path. When that paper reaches the predetermined inspecting position, it is discriminated at the comparing block c whether it is genuine or counterfeit to be excluded. Moreover, in case the paper is genuine, it is counted up at the block d, and this counted result is used at a step subsequent to that block d (although not shown in the flow chart). On the contrary, in case the paper received is discriminated to be counterfeit one to be excluded, the flow is advanced to the block g to count down the number of the sheets of paper summed up so that the reception may be supplied by the number of the sheets of paper to be excluded.

As has been described hereinbefore, according to the present invention, there is provided the reception sensor, the output of which is counted up to determine the number of the sheets of paper received, and this number of the sheets of paper received and the reference number are compared so that the reception is instantly stopped when the two numbers are found coincident and so that the number of the sheet of paper to be excluded is subtracted from the aforementioned number of the sheets of paper received to correct the number of the sheets of paper summed up thereby to supply the reception. As a result, the drawbacks, which are concomitant with the paper counting machine of the aforementioned conventional type due to the excessive reception coming from the delay in the reception control system, i.e., (1) the drawback that the paper having failed to be discriminated is mixed into the intrinsic counterfeit paper to be excluded, and (2) the drawback that a sheet or sheets of the undiscriminated paper has to be again counted can be completely eliminated.

What is claimed is:

1. A reception control system for use with a paper counting machine which comprises:
 a paper receiving mechanism for receiving and feeding sheets of paper;
 an inspecting section disposed downstream of the paper receiving mechanism for receiving sheets of paper therefrom and for inspecting the sheets of paper;

a genuineness discriminating unit in said inspecting section for discriminating the genuiness of the sheets of paper and providing an output signal;

a first storage section disposed downstream of the inspecting section for storing the sheets of genuine paper;

a second storage section disposed downstream of the inspecting section for storing sheets of counterfeit paper;

a distributing device disposed upstream of the first and second storage units for distributing genuine sheets of paper into said first storage section and counterfeit sheets of paper into said second storage section;

a gate control unit connected to the output of the genuineness discriminating unit for selectively controlling the distributing device to cause sheets of genuine paper to enter said first storage section and sheets of counterfeit paper to enter said second storage section in response to the output of the genuineness discriminating unit;

a reference number memory unit for storing the number of sheets of genuine paper to be received and providing an output signal indicative thereof;

a drive control device for controlling the feeding of sheets from the paper receiving mechanism;

a reception sensor disposed immediately downstream of the paper receiving mechanism for detecting and signalling the feeding of sheets of paper thereby;

an up-down counter unit responsive to a first input signal from the reception sensor indicative of the number of sheets fed by the paper receiving mechanism for counting up the number of sheets of paper in response to the output of the reception sensor and responsive to a second input signal indicative of a counterfeit sheet of paper for subtracting the number of the sheets of counterfeit paper which is obtained from the output of the genuineness discriminating unit from the number of the sheets of paper counted up thereby to provide an output signal indicative of the number of genuine sheets of paper; and a reception control comparator unit connected to the up-down counter unit and the reference number memory unit for comparing the output signal of said up-down counter unit and the output signal of said reference number memory unit thereby to compare the corrected number of the sheets of paper and the reference number to control the operation of the drive control device so that the feeding of paper sheets from the paper receiving mechanism is stopped when the desired number of genuine sheets has been collected.

2. The control system of claim 1 wherein said up-down counter is connected to said gate control unit.

* * * * *